Feb. 9, 1937. F. E. KEY 2,070,084
TUBE CONNECTING DEVICE
Filed Aug. 1, 1932  3 Sheets-Sheet 1

INVENTOR:
FREDERICK E. KEY
BY Bakewell & Church
ATTORNEYS.

Feb. 9, 1937. F. E. KEY 2,070,084
TUBE CONNECTING DEVICE
Filed Aug. 1, 1932 3 Sheets-Sheet 3

INVENTOR:
FREDERICK E. KEY.
BY Bakewell & Church
ATTORNEYS.

Patented Feb. 9, 1937

2,070,084

UNITED STATES PATENT OFFICE 2,070,084

TUBE CONNECTING DEVICE

Frederick E. Key, St. Louis, Mo., assignor to Key Company, a corporation of Missouri Application August 1, 1932, Serial No. 627,189

7 Claims. (Cl. 285—20)

This invention relates to devices of the kind that are used for joining or connecting two pipes, tubes or conduits, and particularly, tube connecting devices of the type in which the tubular connecting element that establishes communication between the interior of the tubes is of such design or construction that it can be removed so as to provide access to the interior of the tubes.

The main object of my invention is to provide a tube connecting device of the general type referred to, that is inexpensive to construct, easy to install and remove and of such design that the joints between the tubular connecting element and the tubes will remain tight under extremely high temperatures and pressures.

Another object is to provide a novel tube spacing and holding clamp.

Fig. 1 of the drawings is a side elevational view, partly in vertical section, of a tube connecting device embodying my invention, designed for use in an oil still for establishing communication between two parallel tubes.

While I have herein illustrated my invention embodied in a return bend fitting for oil stills, I wish it to be understood that the invention is applicable to devices that are used to join or establish communication between various types and kinds of tubes, pipes or conduits disposed either in parallel or angular relationship.

Figure 1:
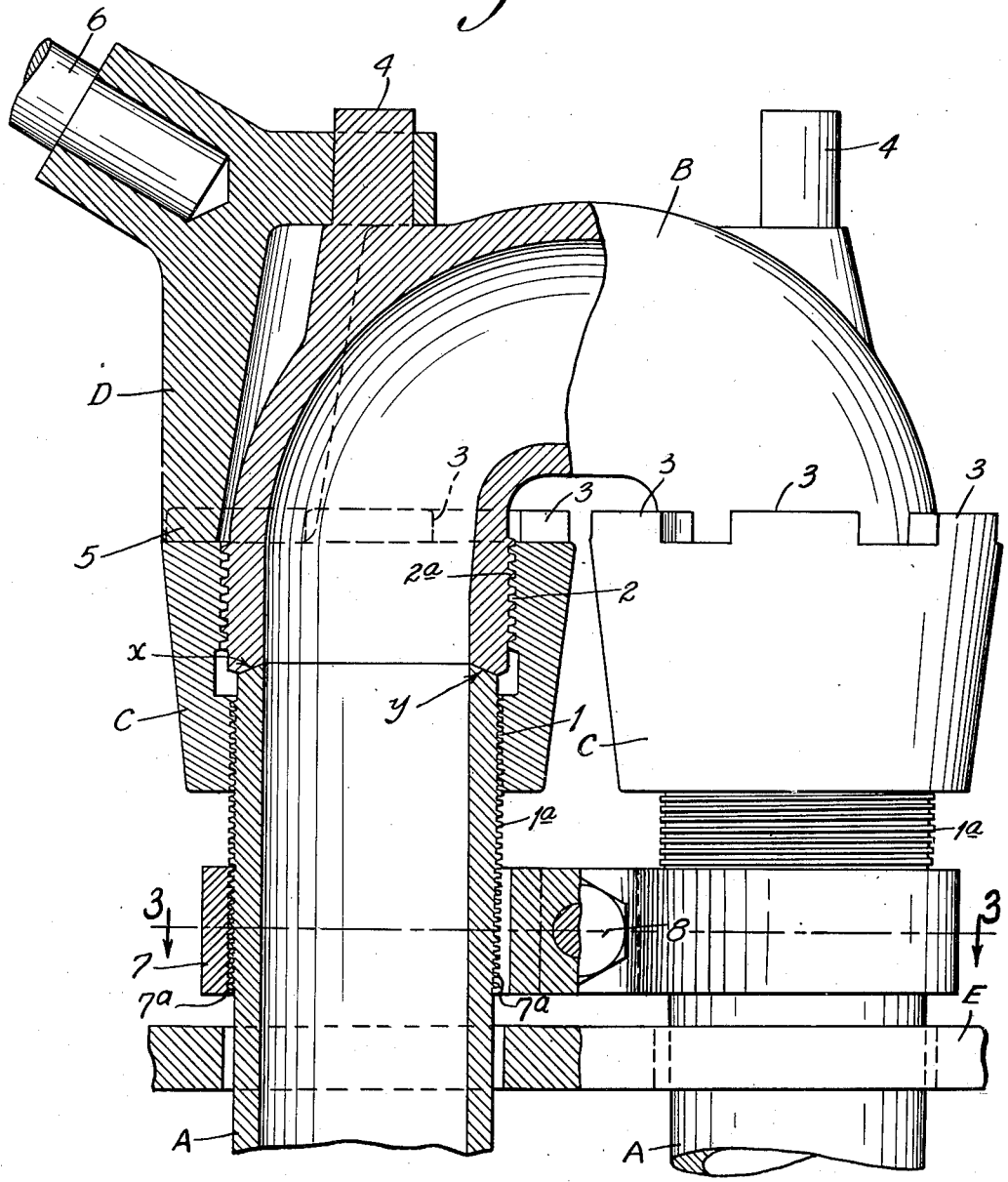

In the accompanying drawings which illustrate the preferred form of my invention, A designates two tubes, pipes or conduits, and B designates a tubular connecting element of the kind commonly referred to as a "U-bend" or a "return bend" that establishes communication between the interior of the tubes A and which is combined with same in such a manner that it can be easily removed to provide access to the interior of the tubes. The connecting element B is held in operative relationship with the tubes A by two coupling sleeves C that have differential internal threads which co-operate with external threads on the tubes A and on the connecting element B. Preferably, the co-acting parts of the structure are so designed that when they are being combined in operative relationship, the ends of the tubes A and the ends of the U-bend or connecting element B will be drawn into sufficiently snug engagement with each other to produce joints between the U-bend and the tubes that will remain tight under excessively high pressures and temperatures, such as the temperatures and pressures that exist in an oil cracking still. The opposed ends or contacting surfaces on the tubes A and on the U-bend B may be of any preferred type or design, but I prefer to construct said parts in such a manner that when the return bend is drawn into engagement with the ends of the tubes, absolutely tight joints will be produced between said parts, even though one tube projects slightly beyond the other. Thus, as shown in Fig. 1, the tubes A are provided with ends $x$ that are slightly convexed, and the return bend B is provided with ends $y$ that are slightly concave so as to form substantially ball and socket joints between the tubes A and the U-bend B that will permit the U-bend to rock on one tube, and thus seat properly against the other tube in the operation of attaching the U-bend to the tubes, in the event there is a slight mal-alignment in the tube ends. As previously stated, however, the type or kind of contacting surfaces that the tubes and return bend are equipped with is immaterial and may be varied to suit existing conditions or the will of the user.

Each of the coupling sleeves C is provided with a differential thread formed by two internally threaded portions 1 and 2 of different pitch. The threads of said portions 1 and 2 must be of the same kind or extend in the same direction, i. e., both must either be right hand threads or both must be left hand threads. The tubes A are provided with external threads $1^a$ designed so as to properly mesh or co-act with the internal threads 1 of the coupling sleeves C, and the U-bend B is provided with externally threaded portions $2^a$ whose threads are of a different pitch than the threads $1^a$ on the tubes. For example, the external threads $1^a$ on the tubes and the internal threads 1 on the coupling sleeves C may be six pitch right hand threads, and the external threads $2^a$ on the tubes and the internal threads 2 on the coupling sleeves C may be four pitch right hand threads. The threads above referred to may be a standard V thread, a standard U. S. V thread, a full acme thread, a semi-acme thread, or a buttress type thread.

Figure 2:
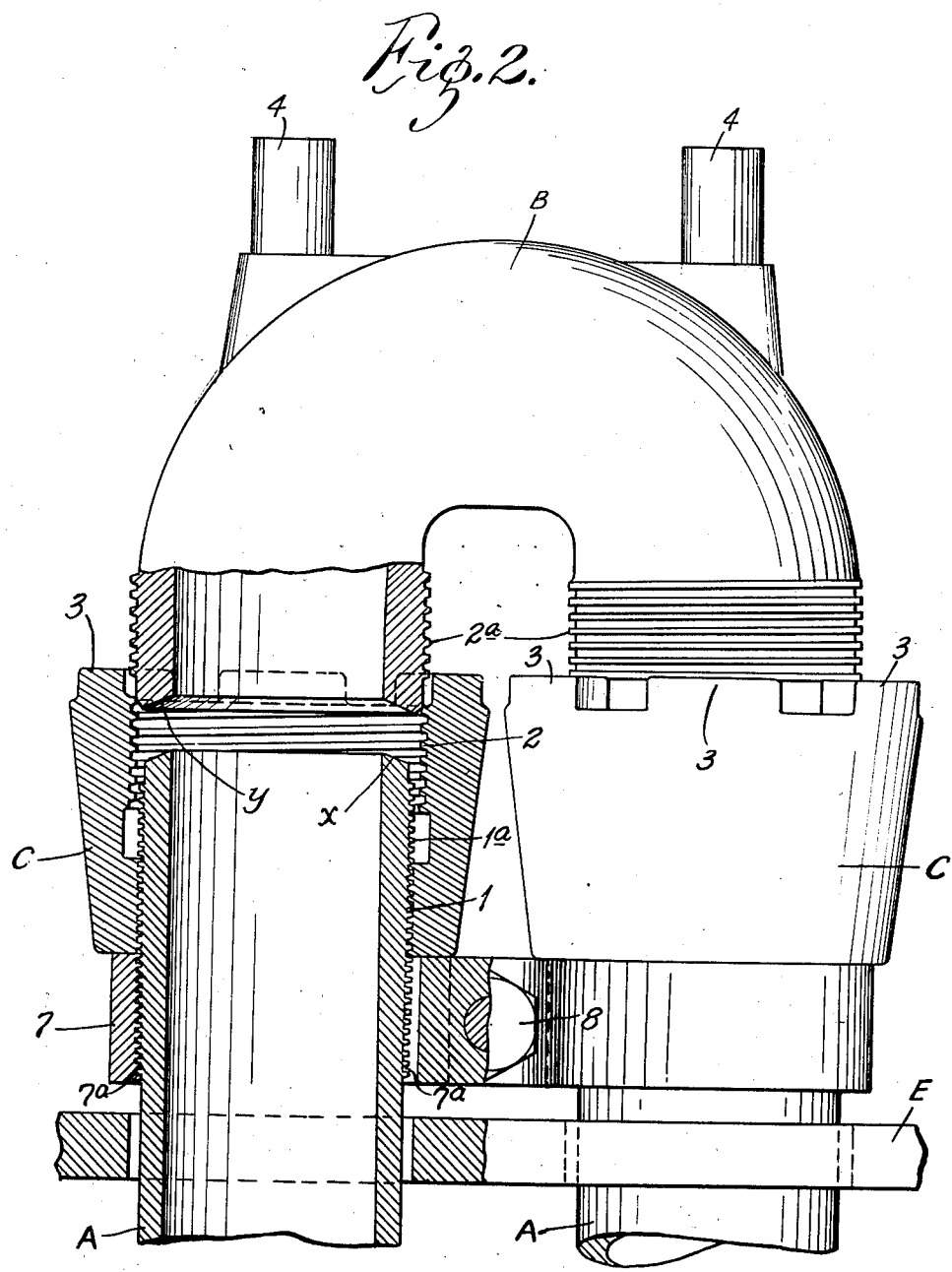
Fig. 2 is a similar view, showing the parts of the structure in the position they occupy preparatory to rotating the coupling sleeves so as to draw the tubular connecting element into tight engagement with the ends of the tubes.

In assembling the parts of the structure, the coupling sleeves C, after being mounted on the tubes A, are backed off or rotated sufficiently to cause the threaded portions 2 of said sleeves to lie in the zone of the tube ends, as shown in Fig. 2. The ends of the U-bend B are then engaged with the threaded portions 2 of the coupling sleeves, the threads 2ª on the U-bend being so located that after they have been meshed with or engaged with the threads 2 of the coupling sleeves, there will be a space between the opposed contacting surfaces $x$ and $y$ on the tubes and U-bend, respectively. The coupling sleeves C are then rotated in a direction to cause said sleeves to travel outwardly towards the ends of the tubes (upwardly looking at Fig. 2) and cause the threads 2 on said sleeves to travel over the threads 2ª on the U-bend B. During such rotary movement of the sleeves C the U-bend is drawn towards and into tight engagement with the tubes, due, of course, to the fact that the U-bend and the co-acting portions of the coupling sleeves have threads 2ª and 2, respectively, that comprise less threads to the inch than the threads 1ª on the tubes and the co-acting threads 1 on the coupling sleeves. In other words, the above described rotary movement of the coupling sleeves C not only causes said sleeves to surround or embrace the terminal portions of the tubes A and U-bend B, but it also causes the U-bend to be drawn towards the tubes and the surfaces $y$ on said U-bend forced into absolutely tight engagement with the opposed contacting surfaces $x$ on the tubes.

The external surfaces of the side portions of the coupling sleeves C may be constructed so as to be engaged by a jaw wrench or spanner wrench, or said coupling sleeves may be provided at their outer ends with lugs 3 or equivalent devices that are adapted to be engaged by a tool or instrument that is used to rotate said sleeves. If desired, the return bend B may be provided with a means that is used to center, locate or define the position of a tool that is being used to rotate the coupling sleeves C. In the form of my invention herein illustrated the return bend B is provided with two trunnion portions 4 arranged in longitudinal alignment with the externally threaded portions of the U-bend so as to receive a tool D that is employed to turn the coupling sleeves. In the operation of combining the U-bend with the tubes the tool D is positioned on one of the trunnion portions 4 of the U-bend with a plurality of spaced teeth 5 on the tool in engagement with a plurality of lugs 3 on one of the coupling sleeves. Thereafter the handle 6 of the tool is swung about the trunnion portion 4 as an axis so as to turn the coupling sleeve C which the tool engages. After one coupling sleeve has been screwed onto one threaded portion 2ª of the U-bend, the other coupling sleeve is screwed onto the other terminal portion of the U-bend by mounting the tool on the other trunnion portion 4 and swinging or manipulating the tool in a similar manner, it being, of course, understood that the coupling sleeves C are tightened sufficiently to cause the surfaces $y$ on the U-bend to be drawn into tight engagement with the surfaces $x$ on the tubes. In the operation of disassembling the parts of the structure the same procedure is employed, with the exception, of course, that the coupling sleeves C are rotated in the reverse direction, which operation causes the U-bend B to be positively forced out of engagement with the tubes, due, of course, to the differential threaded portions of the coupling sleeves.

Figure 3:
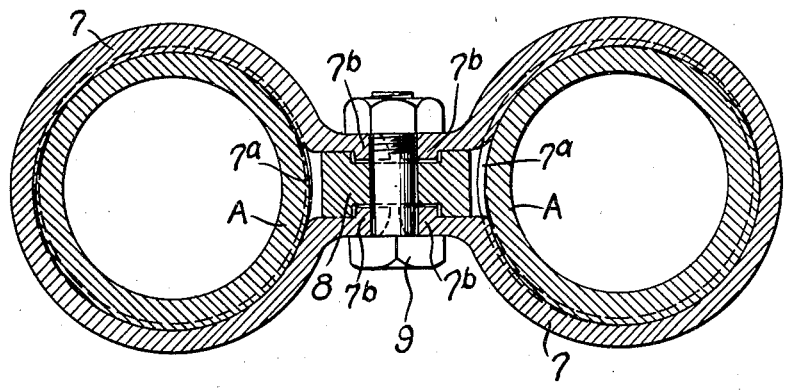
Fig. 3 is a horizontal sectional view, taken on the line 3—3 of Fig. 1.

In the drawings the tubes A are illustrated as projecting outwardly through a tube sheet E. My complete return bend fitting preferably comprises a novel tube spacing and holding clamp that holds the tubes A parallel and in spaced relationship, and prevents said tubes from moving endwise or longitudinally relatively to each other when the U-bend is not in operative position. Said clamp has the added advantage or desirable characteristic of being constructed in such a manner that it effectively takes up torsional strains and prevents the tubes from twisting. Preferably, the tube holding and spacing clamp above referred to is composed of two split clamps 7 provided with internal screw threads 7ª, a key member 8 positioned in the bifurcated or split portions of said clamps, and a bolt or other suitable fastening device 9 that passes through the key member 8 and through the bifurcated portions of the two clamping members 7 to join said members together, and thus form in effect a tie bar that is arranged transversely of the tubes A and which holds said tubes parallel and in properly spaced relationship with each other when the U-bend B is not in operative position. The internal threads 7ª of the members 7 mesh with the external threads 1ª on the tubes, and accordingly, the clamp prevents the tubes from moving longitudinally or endwise relatively to each other during the operation of cleaning the interior of the tubes when the U-bend B is removed. The connecting member 8 that is used to join the two parts 7 of the clamp together is made of such cross-sectional shape that when it is combined with the members 7, it acts as a key which effectively takes up torsional strains on the tubes, and prevents the tubes from twisting. In the form of my invention herein illustrated the key member 8 is of substantially H-shape in cross section, and the open ends or bifurcated portions of the clamp members 7 are provided with substantially hook-shaped portions 7ᵇ, as shown in Fig. 3, that interlock with the key member 8 when the bolt 9 is tightened, and thus produce in effect two collars on the portions of the tubes that project beyond the tube sheet E, which are joined together by a key that takes up the torsional strains on the tubes. The said clamp can be easily applied to or removed from the tubes, due to the fact that it is composed of two separate parts, i. e., the members 7, that can be screwed onto the externally-threaded portions 1ª of the tubes and then joined together by the key member 8 and the retaining bolt 9.

In the operation of assembling the parts of the structure the clamp members 7 are screwed onto the tubes as far as they will go, and said members 7 are then joined together by the key member 8 and bolt 9. The coupling sleeves C are then screwed onto the tubes and moved into engagement with the clamp members 7 which act as stops to limit or determine the position of the coupling sleeves. This is a very desirable feature of my improved fitting, for it overcomes the necessity of extreme accuracy, skill or care on the part of the workman in positioning the coupling sleeves C preparatory to arranging the U-bend B in engagement with the tubes. All that it is necessary for the workman to do, when the fitting is first being installed in a still or when the U-bend is being replaced after the tubes have been cleaned, is to rotate the coupling sleeves until they strike against the clamp members 7, for when the coupling sleeves are in engagement with said clamp members 7, the internally-threaded portions 2 of said sleeves will be in such relationship with the ends of the tubes that the subsequent rotary movement of the coupling sleeves in the reverse direction, after the threaded ends of the U-bend have been engaged with same, will cause the surfaces $y$ on the U-bend to be drawn into absolutely tight engagement with the surfaces $x$ on the tubes before the threaded portions 1 of the coupling sleeves C leave the externally-threaded portions 1ª of the tubes.

A tube connecting device or return bend fitting of the construction above described is inexpensive to construct, because it is composed of only a relatively few parts of simple design that can be easily produced by conventional machine operations. It is easy to assemble or disassemble, and it has the very desirable characteristic of positively forcing the U-bend out of engagement with the tube ends in the operation of loosening or taking off the clamping sleeves that clamp the U-bend against the ends of the tubes. When in use the joints between the U-bend and the tubes will remain absolutely tight, even when subjected to extremely high temperatures and pressures, because the U-bend is held in clamped engagement with the ends of the tubes by rugged, internally screw-threaded coupling sleeves that completely surround the terminal portions of the tubes and the U-bend.

Figure 4:
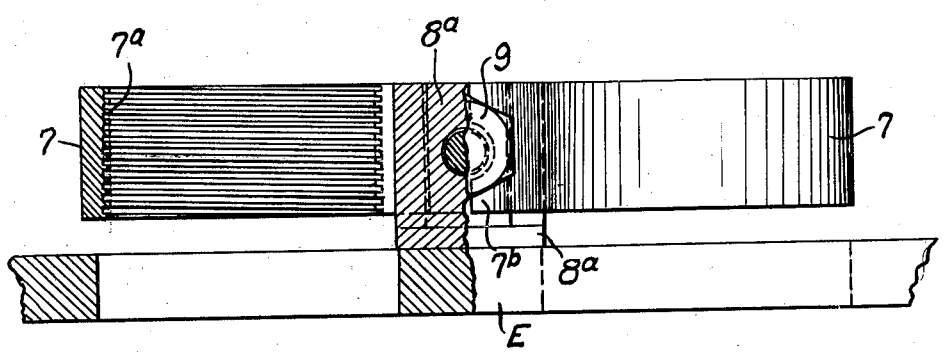
Fig. 4 illustrates my improved tube spacing and holding clamp anchored to the tube sheet.

The clamp that is mounted on the tubes between the tube sheet and the U-bend also has the desirable characteristics of being inexpensive to construct and easy to install or remove, and as previously explained, it prevents relative lateral and endwise movement of the tubes and effectively takes up torsional strains on the tubes. In most instances said clamp will not be anchored to the tube sheet E, but, if desired, the key member of the clamp can be attached to the tube sheet E, as indicated by the reference character 8ª in Fig. 4. When constructed in this manner the clamp prevents the tubes from moving endwise relatively to the tube sheet. Obviously, when the key member 8ª is mounted on or carried by the tube sheet, it is necessary to withdraw the tubes from the tube sheet slightly in the operation of screwing the clamp members 7 onto the tubes, and thereafter, shift the tubes endwise into the tube sheets, so as to cause the bifurcated portions of the clamp members 7 to interlock with the key member 8ª, after which the retaining bolt 9 is inserted.

Having thus described my invention, what I claim as new and desire to secure by Letters Patent is:

1. In a return bend fitting, the combination of two tubes, a tube sheet through which said tubes project, a removable U-bend for establishing communication between the interior of said tubes, means for holding said U-bend in operative relationship with the tubes, and a clamp apart from said means arranged transversely of the tubes between the tube sheet and the U-bend and having internally threaded portions that surround externally threaded portions of the tubes.

2. In a return bend fitting, the combination of two tubes, a tube sheet through which said tubes project, a removable U-bend for establishing communication between the interior of said tubes, means for holding said U-bend in operative relationship with the tubes, a clamp apart from said means arranged transversely of the tubes between the tube sheet and the U-bend and having internally threaded portions that surround externally threaded portions of the tubes, said clamp comprising separate members that surround the tubes, and a key for joining said separate members together.

3. In a U-bend fitting, the combination of two tubes, a tube sheet through which said tubes project, a removable U-bend for establishing communication between the interior of said tubes, coupling sleeves provided with differential internal threads, mounted on externally-threaded portions of the tubes and adapted to be screwed onto externally threaded portions of the U-bend, and a clamp arranged transversely of the tubes in front of the tube sheet and provided with separable portions mounted on the externally threaded portions of the tubes.

4. A tube spacing and holding clamp, comprising bifurcated members screwed onto external threads on the tubes, and a key for joining said members together, positioned in the bifurcated portions of said members.

5. A tube spacing and holding clamp, comprising bifurcated members that surround the tubes, a key positioned in the bifurcated portions of said members and interlocked with the same, and means for clamping said key and bifurcated portions together.

6. In a return bend fitting, the combination of two parallel tubes having external threads on their adjacent end portions, a removable U-bend having its ends opening into said tubes respectively and having threads of greater pitch on its end portions than the threads on the end portions of said tubes, coupling sleeves screwed on said threads on said tubes and adapted to be screwed on said threads on said U-bend and thereby draw the ends of the U-bend into tight engagement with the ends of the tubes, and means detachably engaging said threads on said tubes for holding said tubes from twisting and defining or determining the positions of said coupling sleeves on said tube end portions preparatory to position the U-bend for engagement by said coupling sleeves in the operation of assembling all of said parts.

7. In a return bend fitting, the combination of two tubes having threaded end portions, a tube sheet through which the end portions of said tubes extend, a removable U-bend for establishing communication between the interior of said tubes and having threaded end portions, coupling elements screwed on the threaded end portions of said tubes and said U-bend and holding said U-bend in tight engagement with the ends of said tubes respectively, and a clamp having threads screwed on said threaded end portions of said tubes and holding said tubes against relative lateral and endwise movement.

FREDERICK E. KEY.